United States Patent
Hwang et al.

(10) Patent No.: US 11,830,634 B2
(45) Date of Patent: Nov. 28, 2023

(54) COMPLEX DECOMMISSIONING METHOD FOR NUCLEAR FACILITY

(71) Applicant: KOREA HYDRO & NUCLEAR POWER CO., LTD., Gyeongju-si (KR)

(72) Inventors: Young Hwan Hwang, Daejeon (KR); Seok-Ju Hwang, Daejeon (KR); Ju-Young Yoon, Daejeon (KR); Cheon-Woo Kim, Daejeon (KR)

(73) Assignee: KOREA HYDRO & NUCLEAR POWER CO., LTD., Gyeongju-si (KR)

( * ) Notice: Subject to any disclaimer, the term of this patent is extended or adjusted under 35 U.S.C. 154(b) by 289 days.

(21) Appl. No.: 17/437,073

(22) PCT Filed: Mar. 5, 2020

(86) PCT No.: PCT/KR2020/003114
§ 371 (c)(1),
(2) Date: Sep. 8, 2021

(87) PCT Pub. No.: WO2020/184899
PCT Pub. Date: Sep. 17, 2020

(65) Prior Publication Data
US 2022/0165439 A1   May 26, 2022

(30) Foreign Application Priority Data
Mar. 8, 2019 (KR) .................. 10-2019-0027064

(51) Int. Cl.
*G21D 1/00* (2006.01)
*B23D 1/18* (2006.01)
*B23D 33/04* (2006.01)

(52) U.S. Cl.
CPC ............... *G21D 1/003* (2013.01); *B23D 1/18* (2013.01); *B23D 33/04* (2013.01)

(58) Field of Classification Search
CPC .......... G21D 1/003; B23D 1/18; B23D 33/04
See application file for complete search history.

(56) References Cited

U.S. PATENT DOCUMENTS 3,370,888 A * 2/1968 Skendrovic ........... F27D 1/1694
173/196
3,901,073 A * 8/1975 Dent ................... G01N 29/265
376/249

(Continued)

FOREIGN PATENT DOCUMENTS

| DE | 9410107 | 9/1994 | |
| EP | 500404 A1 * | 8/1992 | ............. G21D 1/003 |

(Continued)

OTHER PUBLICATIONS

English Translation of JP-07159596-A (Year: 1993).*
EPO, Search Report of EP 20770832.2 dated Oct. 17, 2022.

*Primary Examiner* — Jason L Vaughan
(74) *Attorney, Agent, or Firm* — LEX IP MEISTER, PLLC (57) ABSTRACT

A method for complex-decommissioning a nuclear facility is disclosed. The method for complex-decommissioning the nuclear facility includes: cutting and expanding an inner wall of the cavity; installing a cutting device that cuts and decommissions the nuclear reactor pressure vessel inside the cavity; fixing the nuclear reactor pressure vessel inside the cavity by using a fixture; and cutting and decommissioning the nuclear reactor pressure vessel fixed inside the cavity by using a cutting device.

7 Claims, 7 Drawing Sheets

(56) References Cited

U.S. PATENT DOCUMENTS

| | | | | |
|---|---|---|---|---|
| 4,068,895 A | * | 1/1978 | Reese | E04G 23/02 |
| | | | | 173/195 |
| 4,299,658 A | * | 11/1981 | Meuschke | F22B 37/58 |
| | | | | 976/DIG. 293 |
| 4,594,774 A | * | 6/1986 | Barker | G21D 1/003 |
| | | | | 976/DIG. 293 |
| 4,664,873 A | * | 5/1987 | Hendrich | B25J 19/023 |
| | | | | 212/319 |
| 4,813,313 A | * | 3/1989 | Ichikawa | B28D 1/045 |
| | | | | 976/DIG. 293 |
| 5,001,870 A | * | 3/1991 | Yokota | B24C 1/045 |
| | | | | 451/92 |
| 5,158,739 A | * | 10/1992 | Gente | G21F 9/005 |
| | | | | 409/137 |
| 5,173,250 A | * | 12/1992 | Ichikawa | B28D 1/088 |
| | | | | 376/310 |
| 5,203,244 A | * | 4/1993 | Guigon | G21F 9/30 |
| | | | | 82/83 |
| 5,239,564 A | * | 8/1993 | Jacquier | G21F 9/30 |
| | | | | 83/930 |
| 5,268,550 A | | 12/1993 | Blocquel et al. | |
| 5,297,182 A | * | 3/1994 | Cepkauskas | G21D 1/003 |
| | | | | 376/260 |
| 5,329,562 A | * | 7/1994 | Kubo | B23D 57/0084 |
| | | | | 376/260 |
| 5,974,924 A | * | 11/1999 | Schartinger | B23D 21/14 |
| | | | | 83/886 |
| 6,087,546 A | * | 7/2000 | Griffiths | G21F 9/36 |
| | | | | 250/507.1 |
| 8,873,696 B2 | * | 10/2014 | Heim | G21D 3/00 |
| | | | | 376/263 |
| 2005/0268550 A1 | | 12/2005 | Weder | |

FOREIGN PATENT DOCUMENTS

| | | |
|---|---|---|
| JP | 60-091299 | 5/1985 |
| JP | S60-113165 | 7/1985 |
| JP | 07-159596 | 6/1995 |
| JP | 2787125 | 8/1998 |
| JP | 2004-061394 | 2/2004 |
| JP | 2006-038730 | 2/2006 |
| JP | 2006-098165 | 4/2006 |
| JP | 2015-206759 | 11/2015 |
| JP | 2018-16706 | 2/2018 |
| JP | 2018-165706 | 10/2018 |
| JP | 2019-032240 | 2/2019 |
| JP | 2021-519934 | 8/2021 |
| KR | 10-1522224 | 5/2015 |
| WO | 2016-183388 | 11/2016 |
| WO | 2019-203578 | 10/2019 |

\* cited by examiner

COMPLEX DECOMMISSIONING METHOD FOR NUCLEAR FACILITY

TECHNICAL FIELD

The present invention relates to a method for decommissioning a nuclear facility.

BACKGROUND ART

Generally, among nuclear facilities used for nuclear power generation, a pressurized water reactor type of nuclear power plant includes a nuclear reactor pressure vessel and bio-protective concrete surrounding the nuclear reactor pressure vessel.

When decommissioning a nuclear facility, it is necessary to separate the nuclear reactor pressure vessel from the bio-protective concrete, and to cut and decommission the nuclear reactor pressure vessel.

However, there is a problem in that it requires an excessive working time for cutting and decommissioning the nuclear reactor pressure vessel.

DISCLOSURE

Technical Problem

An embodiment of the present invention is to provide a complex decommissioning method of a nuclear facility that may stably cut and decommission a nuclear reactor pressure vessel while reducing a working time.

Technical Solution

An embodiment of the present invention provides a method for complex-decommissioning a nuclear facility that includes a nuclear reactor pressure vessel and bio-protective concrete including a cavity in which the nuclear reactor pressure vessel is positioned, including: cutting and expanding an inner wall of the cavity; installing a cutting device that cuts and decommissions the nuclear reactor pressure vessel inside the cavity; fixing the nuclear reactor pressure vessel inside the cavity by using a fixture; and cutting and decommissioning the nuclear reactor pressure vessel fixed inside the cavity by using a cutting device.

The cutting device may include: a first rail installed in a vertical direction of an inner wall surface of the cavity; a second rail installed in a round shape in a circumferential direction of the cavity, and raised and lowered inside the cavity along the first rail; a driver providing an elevating driving force to the second rail; and a cutter movably installed along the second rail to cut and decommission the nuclear reactor pressure vessel.

The driver may include: a rack gear installed in the first rail; a pinion gear installed in the second rail and engaged with the rack gear; and a driving motor providing a driving force to the pinion gear.

The second rail may be respectively installed at an upper position and a lower position of the first rail, and may be installed to be able to be raised and lowered along the first rail.

The fixture may be provided with one end supported in contact with the inner wall surface of the cavity and the other end supported in contact with a surface of the nuclear reactor pressure vessel, and may include a variable rod of which length is varied.

The variable rod may include: a first rod provided with one end supported in contact with the inner wall surface of the cavity; a second rod provided with one end supported in contact with the surface of the nuclear reactor pressure vessel; and a rotating rod that is provided with one side screwed to the first rod and the other side screwed to the second rod and that makes the first rod and the second rod come close to each other or separates them from each other.

The nuclear facility may further include a crane positioned on the bio-protective concrete to support the nuclear reactor pressure vessel in the cavity.

Advantageous Effects

According to the embodiment of the present invention, a nuclear reactor pressure vessel is cut and decommissioned by a cutter capable of elevating and moving in a circumferential direction inside a cavity while being fixed by a fixture inside the cavity of bio-protective concrete, thereby stably cutting and decommissioning the nuclear reactor pressure vessel while reducing a working time.

MODE FOR INVENTION

The present invention will be described more fully hereinafter with reference to the accompanying drawings, in which embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification.

Figure 1:
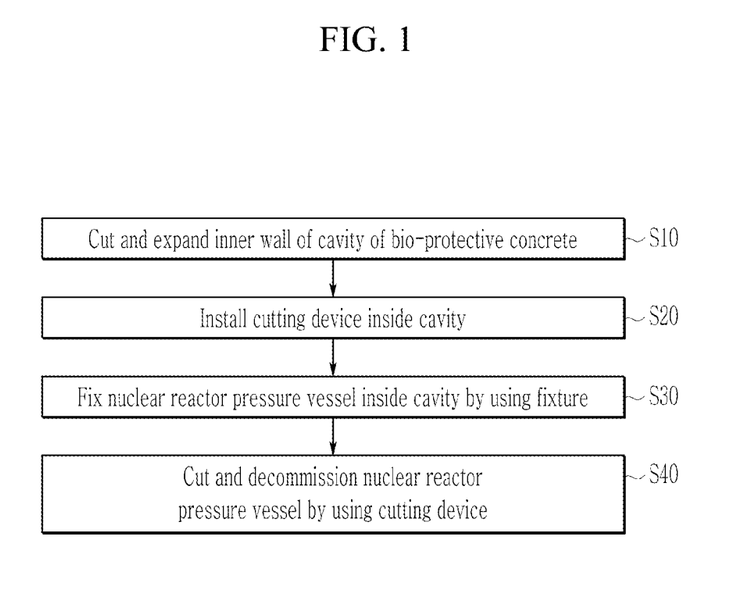
FIG. 1 schematically illustrates a flowchart of a method for decommissioning a nuclear facility according to an embodiment of the present invention.
Figure 2:
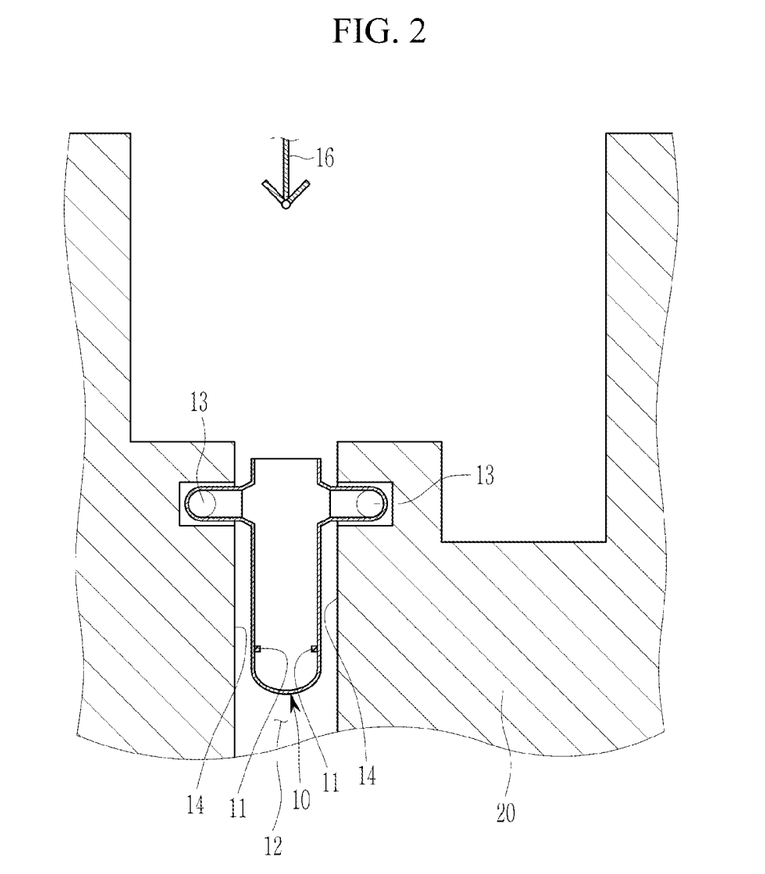
FIG. 2 schematically illustrates a part of a nuclear facility according to an embodiment of the present invention.

FIG. 1 schematically illustrates a flowchart of a method for decommissioning a nuclear facility according to an embodiment of the present invention, and FIG. 2 schematically illustrates a part of a nuclear facility according to an embodiment of the present invention.

As illustrated in FIG. 1 and FIG. 2, a nuclear facility may include a nuclear reactor pressure vessel 10, a plurality of pipes 13 directly connected to the nuclear reactor pressure vessel 10, bio-protective concrete 20 surrounding the nuclear reactor pressure vessel 10 and the pipes 13 and supporting the nuclear reactor pressure vessel 10, and a crane 16. The nuclear facility may further include various known configurations in addition to the configurations shown in FIG. 2.

The nuclear reactor pressure vessel 10 may be a pressurized water reactor type, but is not limited thereto. For example, the nuclear reactor pressure vessel 10 may be a boiling water reactor type. A protrusion 11 supporting various known types of cores protrudes from an inner wall of the nuclear reactor pressure vessel 10.

The plurality of pipes 13 are connected to various types of known steam generators. Hot water may pass through one of the pipes 13, and cold water may pass through the other pipe thereof, but the present invention is not limited thereto.

The bio-protective concrete 20 may include a cavity 12 in which the nuclear reactor pressure vessel 10 is positioned, and the inner wall 14 forming the cavity 12 and facing the nuclear reactor pressure vessel 10.

The crane 16 may be positioned above the bio-protective concrete 20.

The crane 16 may be a crane 16 used during initial installation of the nuclear facility, but is not limited thereto.

Before expanding the inner wall 14 of the bio-protective concrete 20, insulation surrounding the nuclear reactor pressure vessel 10 may be removed.

Then, the inner wall of the cavity 12 is cut and expanded (S10).

Figure 3:
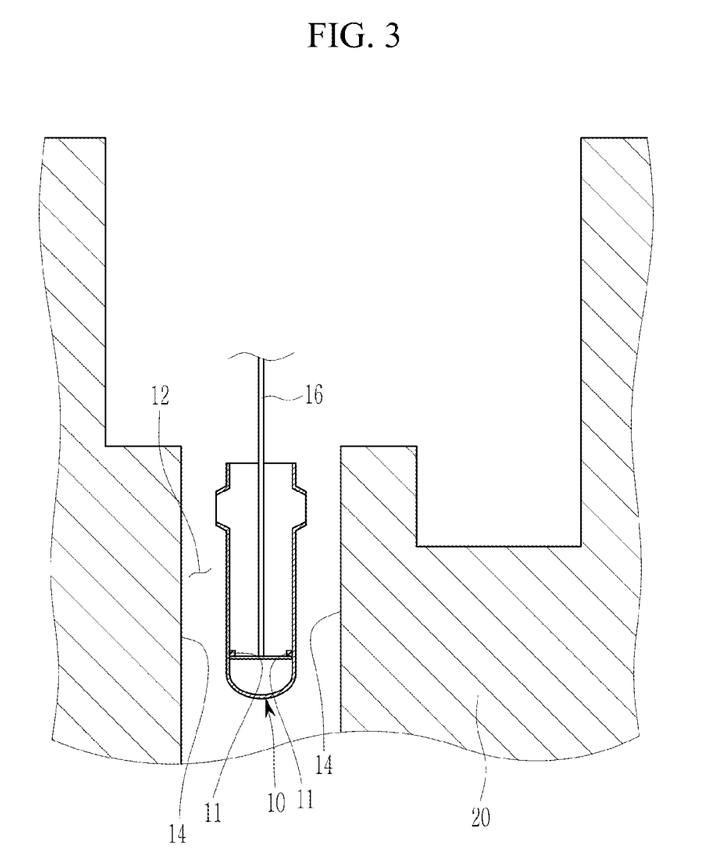
FIG. 3 illustrates a partial view of a state in which an inner wall of bio-protective concrete is expanded and pipes are separated from a nuclear reactor pressure vessel in the nuclear facility illustrated in FIG. 2.

FIG. 3 illustrates a partial view of a state in which an inner wall of bio-protective concrete is expanded and pipes are separated from a nuclear reactor pressure vessel in the nuclear facility illustrated in FIG. 2.

Referring to FIG. 3, the inner wall 14 of the bio-protective concrete slab 20 forming the cavity 12 may be cut and expanded by using a cutting member such as a wire saw or a circular saw.

In FIG. 3, a part of the inner wall 14 corresponding to the nuclear reactor pressure vessel 10 is expanded, but the present invention is not limited thereto, and a part of the inner wall 14 corresponding to an upper portion of the pipes 13 may be expanded.

As the inner wall 14 of the bio-protective concrete 20 is expanded, the pipes 13 are exposed in an upper direction.

Next, the pipes 13 are separated from the nuclear reactor pressure vessel 10.

Specifically, the pipes 13 exposed through the expanded inner wall 14 of the bio-protective concrete 20 are cut in a diameter direction of the pipes 13, and the pipes 13 are separated from the nuclear reactor pressure vessel 10.

The cutting of the pipes 13 may be performed by using a wire saw, but is not limited thereto, and may be performed by using another cutting member such as a circular saw.

Since the pipes 13 are completely exposed through the expanded inner wall 14, the pipes 13 may be easily cut through at the expanded inner wall 14 by using a cutting member.

Next, a cutting device 30 for cutting and decommissioning the nuclear reactor pressure vessel 10 by moving in longitudinal or transverse directions of the cavity 12 is installed (S20).

Figure 4:
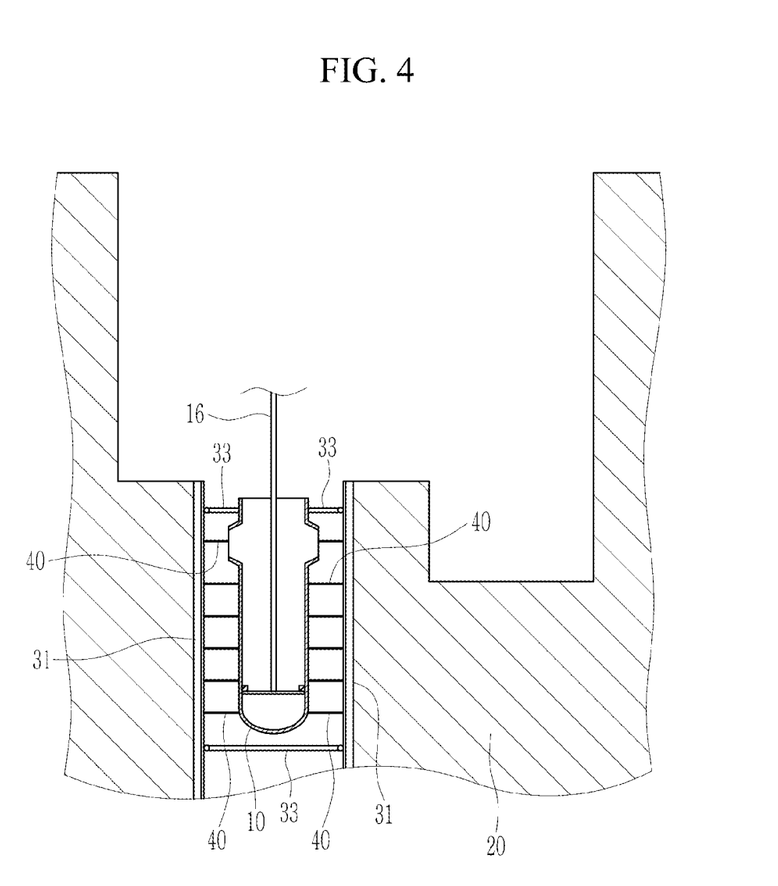
FIG. 4 schematically illustrates a partial view of a state in which a cutting device according to an embodiment of the present invention is installed inside a cavity.
Figure 5:
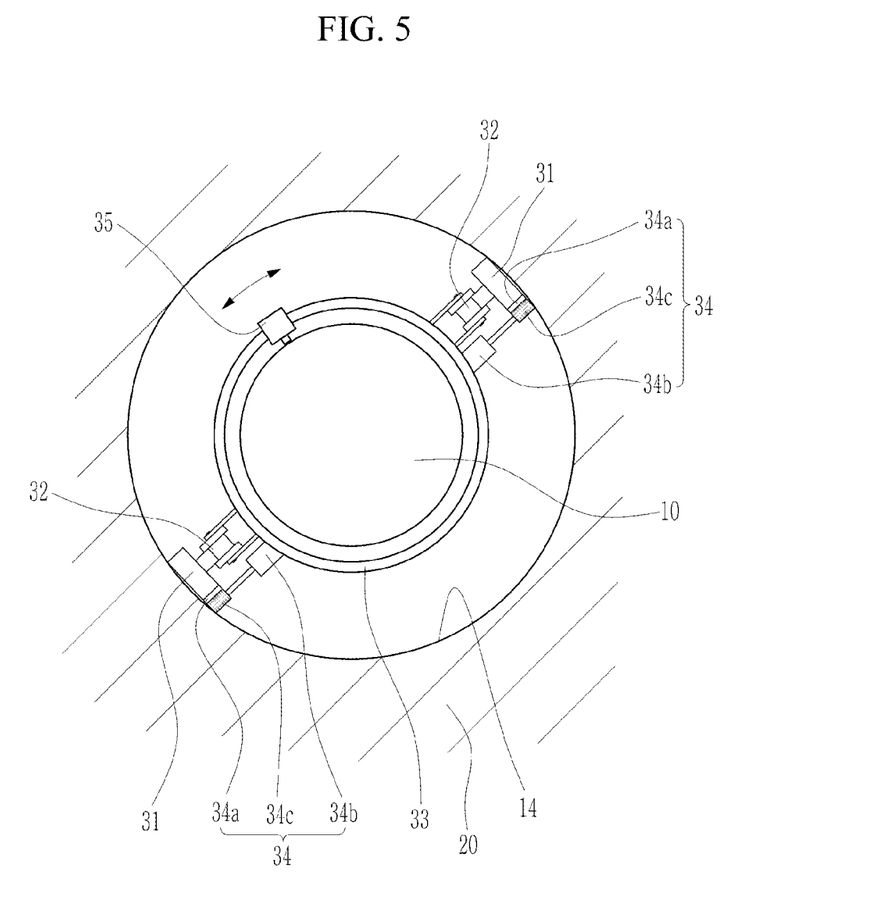
FIG. 5 schematically illustrates a partial top plan view of a state in which the cutting device of FIG. 4 is installed inside a cavity.

FIG. 4 schematically illustrates a partial view of a state in which a cutting device according to an embodiment of the present invention is installed inside a cavity, and FIG. 5 schematically illustrates a partial top plan view of a state in which the cutting device of FIG. 4 is installed inside a cavity.

As illustrated in FIG. 4 and FIG. 5, the cutting device 30 may include a first rail 31 installed in a vertical direction of an inner wall surface of the cavity 12, a second rail 33 installed in a round shape in a circumferential direction of the cavity 12 and raised and lowered in the inside of the cavity 12 along the first rail 31, and a cutter 35 movably installed along the second rail 33 to cut and decommission the nuclear reactor pressure vessel 10.

The first rail 31 may be installed to have a long length along a height direction of the inner wall surface of the cavity 12.

The first rail 31 is installed along the height direction of the inner wall surface of the cavity 12, and a pair of first rails 31 may be installed to face each other on the inner wall surface of the cavity 12.

That is, the first rail 31 may be respectively installed at opposite sides of the inner wall surface of the cavity 12 to provide a path for the second rail 33 to be described later to move in the vertical direction inside the cavity 12.

The second rail 33 may be installed in the first rail 31 so as to be raised or lowered.

The second rail 33 is formed in a round shape, and may be formed in a round shape along a circumference of the circumferential direction of the cavity 12. As described above, the second rail 33 is installed, and thus the cutter 35 to be described later may be selectively moved in the circumferential direction of the cavity 12 along the second rail 33. This will be described in detail while describing the cutter 35 below.

Here, the second rail 33 may be installed in each of upper and lower portions of the cavity 12. Accordingly, upper and lower portions of the nuclear reactor pressure vessel 10 may be simultaneously cut and decommissioned inside the cavity 12, so that rapid cutting and disassembly may be performed.

On the other hand, a rotation wheel 32 may be installed in the second rail 33.

The rotating wheel 32 may be respectively installed at positions corresponding to the pair of first rails 31 at opposite sides of the second rail 33.

Accordingly, since the rotation wheel 32 installed on a side surface of the second rail 33 rotatably contacts the first rail 31, the second rail 33 may be selectively raised or lowered along the first rail 31 by driving force of a driver 34.

The second rail 33 may be raised or lowered according to the driving operation of the driver 34 along the first rail 31 installed on the inner wall surface of the cavity 12.

The driving unit 34 may include a rack gear 34*a* installed in the first rail 31, a pinion gear 34*c* installed in the second rail 33 and engaged with the rack gear 34*a*, and a driving motor 34*b* for providing a driving force to the pinion gear 34*c*.

The rack gear 34*a* may be installed on a side surface of the first rail 31 along a length direction of the first rail 31. The pinion gear 34*c* installed in the second rail 33 may be engaged with this rack gear 34*a*.

Since the pinion gear 34*c* is driven by engaging with the rack gear 34*a*, it may be rotatably installed at a driving shaft of the driving motor 34*b* installed in the second rail 33.

Accordingly, the second rail 33 may be selectively raised or lowered along a vertical longitudinal direction of the first rail 31 by the engaging operation of the pinion gear 34*c* and the rack gear 34*a* according to the driving of the driving motor 34*b*.

On the other hand, the cutter 35 may be movably installed in the second rail 33.

The cutter 35 is selectively movably installed along the second rail 33, and may be moved along the second rail 33 by an operation of a rack and pinion gear (not shown) and may be moved along the second rail 33 according to an operation of a driving wheel (not shown).

As described above, the second rail 33 may be raised or lowered inside the cavity 12 along the first rail 31, and the cutter 35 may be movably installed along the circumferential direction of the cavity 12 along the length direction of the second rail 33.

Therefore, since the movement in the vertical direction of the cavity 12 and the movement in the circumferential direction of the cavity 12 are possible according to selection of an operator, the cutter 35 may stably cut and decommission the nuclear reactor pressure vessel 10 fixed to the inside of the cavity 12.

Next, the nuclear reactor pressure vessel 10 is fixed inside the cavity 12 by using a fixture 40 (S30). In step S30, the nuclear reactor pressure vessel 10 may be stably fixed to the inside of the cavity 12 by using a plurality of fixtures 40 installed between the inner wall surface of the cavity 12 and the nuclear reactor pressure vessel 10.

One end of the fixture 40 is supported in contact with the inner wall surface of the cavity 12 and the other end thereof is supported in contact with the surface of the nuclear reactor pressure vessel 10, and the fixture 40 may be applied as a variable rod 40 whose length is variable. It is also possible that the fixture 40 is detachably fixed during movement of the second rail 33. Hereinafter, the fixture and the variable rod use the same reference numeral.

Figure 6:
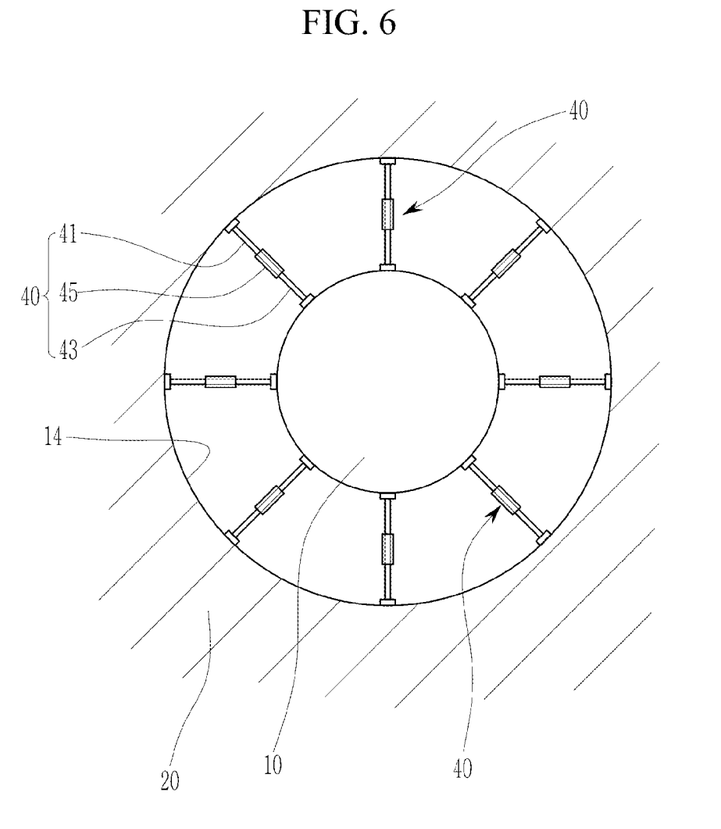
FIG. 6 schematically illustrates a partial top plan view of a state in which a nuclear reactor pressure vessel according to an embodiment of the present invention is fixed by a fixture in the inside of a cavity.
Figure 7:
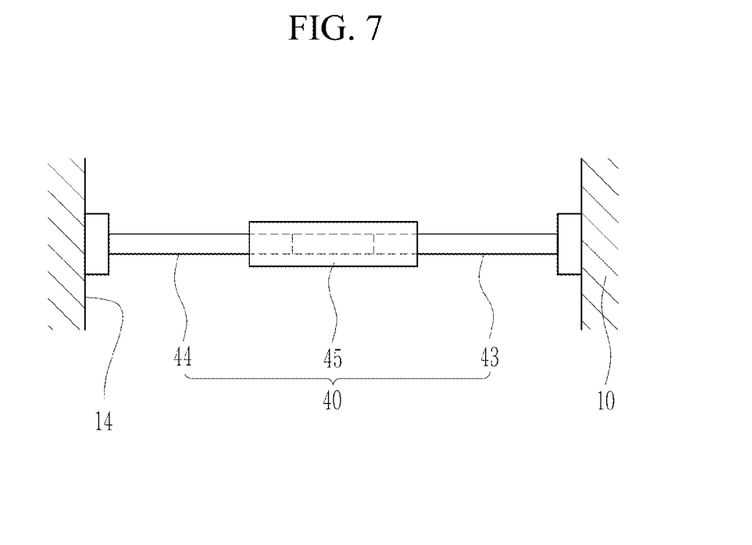
FIG. 7 illustrates a schematic view of the fixture illustrated in FIG. 6.

FIG. 6 schematically illustrates a partial top plan view of a state in which a nuclear reactor pressure vessel according to an embodiment of the present invention is fixed by a fixture in the inside of a cavity. FIG. 7 illustrates a schematic view of the fixture illustrated in FIG. 6.

As illustrated in FIG. 6 and FIG. 7, the variable rod 40 may include a first rod 41 provided with one end supported in contact with the inner wall surface of the cavity 12, a second rod 43 provided with one end supported in contact with the surface of the nuclear reactor pressure vessel 10, and a rotating rod 45 provided with one side screwed to the first rod 41 and the other side screwed to the second rod 43.

A plurality of the variable rods 40 may be radially installed in the cavity 12 between the nuclear reactor pressure vessel 10 and the inner wall surface of the cavity 12.

Accordingly, when the rotating rod 45 is rotated in one direction, the first rod 41 and the second rod 43 may be moved to be closer to each other, and when the rotating rod 45 is rotated in a reverse direction, the first rod 41 and the second rod 43 may be moved to be spaced apart from each other.

As such, since the length of the variable rod 40 may be variably extended according to the rotation of the rotating rod 45 in one direction or the reverse direction, and the variable rod 40 may be changed to a long length according to the rotational operation of the rotating rod 45 in a state that it is inserted into the cavity 12 in a short length to stably fix the nuclear reactor pressure vessel 10 inside the cavity 12.

Next, the nuclear reactor pressure vessel 10 fixed inside the cavity 12 is cut and decommissioned by using the cutting device 30 (S40).

In step S40, as the second rail 33 rises or lowers along the first rail 31 according to the operation of the driver 34, the cutter 35 is moved along with the second rail 33, so that the nuclear reactor pressure vessel 10 may be cut and decommissioned.

Here, since the second rail 33 is respectively installed at the upper and lower positions of the inner wall surface of the cavity 12, the cutter 35 may cut and decommission the upper and lower portions of the nuclear reactor pressure vessel 10 in the cavity 12 at the same time, thus it is possible to reduce the time required for the cutting and decommissioning work process, thereby improving work efficiency.

As described above, as the second rail 33 rises or lowers in the cavity 12 along the first rail 31 in a state in which the nuclear reactor pressure vessel 10 of the present embodiment is fixed by the fixture 40 in the cavity 12, the cutter 35 may be moved along the second rail 33.

Accordingly, the cutter 35 may be moved in the circumferential direction of the cavity 12 while rising or lowering inside the cavity 12, so that the nuclear reactor pressure vessel 10 may be stably cut and decommissioned inside the cavity 12 while reducing the working time.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS nuclear reactor pressure vessel 10, protrusion 11, cavity 12, pipes 13, inner wall 14, crane 16, bio-protective concrete 20, cutting device 30, first rail 31, second rail 32, driver 34, rack gear 34*a*, driving motor 34*b*, pinion gear 34*c*, cutter 35, fixture 40, variable rod 40, first rod 41, second rod 43, rotating rod 45

The invention claimed is:

1. A method for complex-decommissioning a nuclear facility that includes a nuclear reactor pressure vessel and bio-protective concrete including a cavity in which the nuclear reactor pressure vessel is positioned, comprising:
   cutting and expanding an inner wall of the cavity;
   installing a cutting device that cuts and decommissions the nuclear reactor pressure vessel inside the cavity;
   fixing the nuclear reactor pressure vessel inside the cavity by using a fixture; and
   cutting and decommissioning the nuclear reactor pressure vessel fixed inside the cavity by using a cutting device.

2. The method for complex-decommissioning the nuclear facility of claim 1, wherein
   the cutting device includes:
   a first rail installed in a vertical direction of an inner wall surface of the cavity;
   a second rail installed in a round shape in a circumferential direction of the cavity, and raised and lowered inside the cavity along the first rail;
   a driver providing an elevating driving force to the second rail; and
   a cutter movably installed along the second rail to cut and decommission the nuclear reactor pressure vessel.

3. The method for complex-decommissioning the nuclear facility of claim 2, wherein
   the driver includes:
   a rack gear installed in the first rail;
   a pinion gear installed in the second rail and engaged with the rack gear; and
   a driving motor providing a driving force to the pinion gear.

4. The method for complex-decommissioning the nuclear facility of claim 2, wherein
   the second rail is respectively installed at an upper position and a lower position of the first rail, and is installed to be able to be raised and lowered along the first rail.

5. The method for complex-decommissioning the nuclear facility of claim 1, wherein the fixture is provided with one end supported in contact with the inner wall surface of the cavity and the other end supported in contact with a surface of the nuclear reactor pressure vessel, and includes a variable rod of which length is varied.

6. The method for complex-decommissioning the nuclear facility of claim 5, wherein
the variable rod includes:
a first rod provided with one end supported in contact with the inner wall surface of the cavity;
a second rod provided with one end supported in contact with the surface of the nuclear reactor pressure vessel; and
a rotating rod that is provided with one side screwed to the first rod and the other side screwed to the second rod and that makes the first rod and the second rod closer to each other or separates them from each other.

7. The method for complex-decommissioning the nuclear facility of claim 1, wherein
the nuclear facility further includes a crane positioned on the bio-protective concrete to support the nuclear reactor pressure vessel in the cavity.

\* \* \* \* \*